United States Patent [19]

Bolton et al.

[11] 4,407,481
[45] Oct. 4, 1983

[54] VALVE ASSEMBLY FOR A PRESSURIZED AEROSOL-DISPENSING CONTAINER

[75] Inventors: Philip Bolton, Blackburn; Norman Burdekin, Accrington, both of England

[73] Assignee: Neotechnic Engineering Limited, Lancashire, England

[21] Appl. No.: 264,329

[22] Filed: May 18, 1981

[30] Foreign Application Priority Data

May 16, 1980 [GB] United Kingdom ............... 8016285

[51] Int. Cl.³ .............................................. B65D 83/00
[52] U.S. Cl. ................................. 251/353; 222/402.2
[58] Field of Search .................... 222/402.2, 476, 453; 251/353, 354

[56] References Cited

U.S. PATENT DOCUMENTS

| | | | |
|---|---|---|---|
| 2,886,217 | 5/1959 | Thiel | 222/402.2 |
| 3,559,851 | 2/1971 | Steiman | 222/402.2 |
| 3,727,806 | 4/1973 | Wilmot | 222/402.2 |

FOREIGN PATENT DOCUMENTS

| | | |
|---|---|---|
| 872625 | 7/1961 | United Kingdom . |
| 1336379 | 11/1973 | United Kingdom . |
| 1358498 | 7/1974 | United Kingdom . |

*Primary Examiner*—A. Michael Chambers
*Attorney, Agent, or Firm*—Seidel, Gonda & Goldhammer

[57] ABSTRACT

A valve assembly for a pressurized aerosol-dispensing container, in which a hollow body secured inside the container cooperates with an elongate movable valve member operative from outside the container to dispense a predetermined amount only of the liquid contents of the container for each dispensing operation, avoids problems associated with the formation of gas bubbles by providing a second hollow body as a dip-cup concentrically around the first hollow body and dividing the space between the two hollow bodies into a plurality of capillary channels which retain liquid therein. The two hollow bodies are mutually supporting and the second, outer hollow body may be of plastic material or metal. If of plastic material, it can deform on fitting to grip the inner hollow body; if of metal it can be crimped or otherwise deformed into gripping contact with the inner hollow body.

8 Claims, 6 Drawing Figures

VALVE ASSEMBLY FOR A PRESSURIZED AEROSOL-DISPENSING CONTAINER

FIELD OF THE INVENTION

This invention relates to valve assemblies for pressurized aerosol-dispensing containers, commonly known as "aerosol containers", and more particularly to that type of valve assembly in which a hollow body secured inside the container cooperates with an elongate valve member operative from outside the container to dispense a predetermined amount only of the liquid contents of the container for each dispensing operation.

Containers of this type are often used to dispense expensive substances, such as cosmetic and medical preparations. It is important that the amount of the preparation which is dispensed is accurate for each operation of the valve member. Additionally, for any expensive substance, it is important that there should be no wastage of the contents of the container.

DESCRIPTION OF THE PRIOR ART

In one known aerosol container, as described in our UK patent specification No. 1,336,379, the hollow body is located within a second hollow body with an elongate annular capillary gap therebetween, which allows virtually the entire contents of the container to be dispensed. Although such a valve assembly does minimize wastage of the contents, problems have been experienced in some circumstances, in which excessive agitation of the container has led to the formation of gas bubbles. Because such containers are used for example in the dispensing of medical and medicosurgical preparations, it is very important that a precisely regulated quantity of the contents is dispensed for each operation of the valve member. However, if gas bubbles are formed, they can find their way along the capillary gap and into the first-mentioned hollow body, which constitutes a metering chamber for dispensing the correct dose. This adversely affects the dose which is dispensed. It has been found that it is not the metered quantity dispensed immediately following the agitation that is adversely affected, but the amount dispensed at the next subsequent operation of the valve member.

SUMMARY OF THE INVENTION

It is an object of the present invention to reduce the formation of gas bubbles within such a valve assembly, and/or to minimize the adverse effects if such gas bubbles are created.

It is a further object of the present invention to provide a valve assembly for an aerosol container which is relatively simple in construction, which enables substantially all the contents of the container to be dispensed, and yet which overcomes any problems arising from excessive shaking or agitation of the container.

In accordance with the present invention, there is provided a valve assembly comprising a casing member adapted to form at least the top portion of an aerosol container, a first hollow body secured to the inside of the casing member, an elongate valve member sealingly extending through respective apertures in the casing member and hollow body for longitudinal inward movement during a dispensing operation, outlet and inlet passages formed in the valve member at the outer and inner ends thereof respectively and operative to connect a chamber formed by the space inside the hollow body around the valve member with the outside and inside respectively of the container, and a second hollow body encircling and in gripping contact with the first hollow body in such manner as to define a plurality of capillary channels between the two bodies which retain liquid therein.

It has been found that the plurality of capillary channels between the two hollow bodies, which provide a metering chamber and a dip-cup respectively, retain liquid therein to the exclusion of gas bubbles. This is in contrast to the aforesaid known valve assembly in which, although a capillary gap is formed between the two bodies, this is an annular gap which extends around the full circumference of the first hollow body and has been found to permit the passage of gas bubbles along the capillary gap and into the metering chamber. Again, in the aforesaid known valve assembly the outer hollow body is secured to the inner hollow body only at the inward end, so that there is no contact between the two hollow bodies over the greater part of their length. By the provision of a plurality of capillary channels, as opposed to an unbroken annular capillary gap, there can be longitudinal mutual support for the two hollow bodies, thus ensuring that the capillary channels do not change in dimensions.

The second hollow body, or dip-cup, may be made of metal or of plastics material, and is preferably shaped so as to provide the plurality of capillary channels between its internal surface and a smooth, for example cylindrical, external surface of the first hollow body located therewithin.

BRIEF DESCRIPTION OF THE DRAWINGS

Three valve assemblies, each in accordance with the present invention, will now be described by way of example and with reference to the accompanying drawings, in which.

DESCRIPTION OF THE PREFERRED EMBODIMENT

Figure 1:
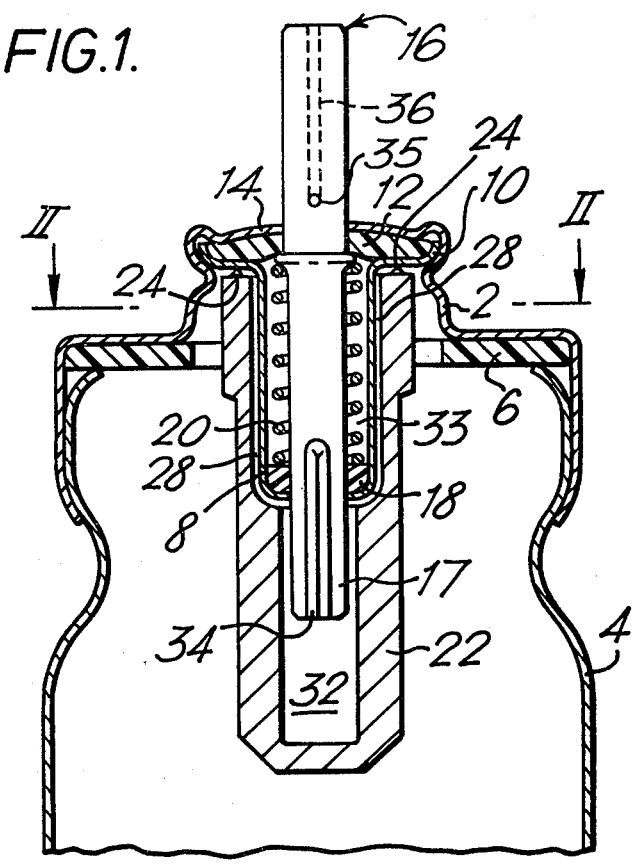
FIG. 1 is a sectional elevation of a first embodiment of valve assembly, fitted to a container, the valve assembly being shown in the outer, non-operative position.
Figure 2:
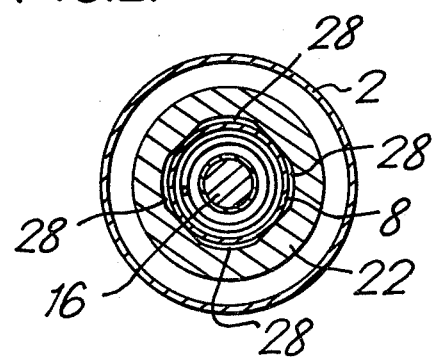
FIG. 2 is a section taken along the line II—II of FIG. 1.

Referring first to FIGS. 1 and 2, the valve assembly comprises a casing 2 which forms a closure cap of an aerosol container 4. A tight seal between the cap 2 and the container 4 is ensured by a sealing gasket 6 clamped therebetween.

A first elongate hollow body 8 is secured at a flanged outer end 10 thereof by means of a resilient diaphragm 12 trapped within an outwardly-convex central portion 14 of the cap 2. An elongate valve member 16 extends centrally through the cap portion 14 and diaphragm 12, and at its inner end 17 projects through the hollow body 8. A sealing washer 18 encircles the valve member 16 at the inward end of the hollow body 8. A helical coil spring 20 is seated at the one end on the sealing washer 18 and at the other end on an annular protuberance on the valve member, and urges the valve member 16 outwardly of the container 4. The sealing engagement between the ends of the valve member 16 and the diaphragm 12 and washer 18 respectively guides the valve member 16 during its movement axially of the container 4 under the control of the spring 20.

A second elongate hollow body 22 which constitutes a dip-cup is made of plastic material and is arranged concentrically around the hollow body 8 within the container 4. At its outward end the dip-cup 22 has four small projections or pips 24 which abut the flanged end 10 of the body 8 to define radial passageways between the pips. The dip-cup 22 extends inwardly from the projections 24 to pass through the gasket 6 with clearance. The interior of the dip-cup 22 is shaped to conform generally with the external surface of the hollow body 8 and with the end 17 of the valve member 16 projecting therefrom. As can be seen particularly clearly from FIG. 2, at four circumferentially-spaced positions, the dip-cup 22 contacts the hollow body 8 with pressure contact to provide four longitudinally extending areas of mutual support and ensuring that the dip-cup is retained in position on the hollow body 8. The internal surface of the dip-cup 22 is convoluted such that the peaks of the convolutions are in supporting abutment with the smooth external cylindrical surface of the body 8, with, between the peaks, four capillary channels 28 extending axially between the hollow body 8 and the dip-cup 22 along substantially the whole length of the hollow body 8. The capillary channels 28 communicate adjacent to the flange 10 with the interior of the container 4 via the passageways between the dip-cup end projections 24. The expression "capillary channel" used herein is to be taken to mean a channel which is sufficiently narrow to allow the liquid contents of the container to rise up the channel by the phenomenon of capillary attraction. The four capillary channels 28 extend inwardly from the flange 10, opening into an enclosure 32 which receives the inward end 17 of the valve member 16. This inward end 17 of the valve member 16 is axially grooved as indicated at 34, with the groove 34 extending over a sufficient length of the valve member 16 so that, in the position shown in FIG. 1, the groove terminates outwardly of the sealing washer 18, i.e. within the metering chamber 33 defined by the hollow body 8.

The illustrated container is operative to dispense metered quantities of the contents, each quantity being of a predetermined volume comprising the liquid contents stored within the chamber 33 defined by the hollow body 8. In use, with the valve assembly as shown in FIG. 1, the container is inverted into its dispensing disposition. The contents of the container 4 can pass freely between the gasket 6 and the dip-cup 22, past the projections or pips 24, along the four capillary channels 28, into the enclosure 32, along the axial groove 34 and into the interior of the hollow body 8 which constitutes the metering chamber 33. The plurality of capillary channels 28 prevent the formation of gas bubbles between the body 8 and the dip-cup 22, as might otherwise occur if the container is agitated excessively for example. To discharge the contents of the metering chamber 33, the valve member 16 is depressed so that its inward end 17 extends further into the enclosure 32. When the closed end of the groove 34 has passed out of the metering chamber 33 beyond the sealing washer 18, the metering chamber is sealed from the inside of the container 4. On further depression of the valve member 16, an orifice 35 therein passes downwardly into the metering chamber 33 and connects this chamber with a valve outlet passage 36, through which the contents of the metering chamber are ejected as an aerosol spray.

With the use of a suitable plastic material for the dip-cup 22, the plastic material can be arranged to deform on assembly of the dip-cup on the hollow body 8 in order thereby to provide the capillary channels spaced around the assembly with the intermediate regions of contact.

In the valve assembly shown in FIGS. 3 and 4, some of the elements are of the same construction as in the embodiment described with reference to FIGS. 1 and 2, and for these elements the same reference numerals have been used in FIGS. 3 and 4.

The second embodiment differs from the first embodiment in the construction of the dip-cup, which is made of metal and is indicated by the reference number 40. As can be seen in FIG. 3, the outward part of the dip-cup 40 extends through the gasket 6 with clearance and terminates in a radially outwardly directed flange 42 which is spaced from the flanged end 10 of the metering chamber body 8, so as to define an annular gap 44 therebetween. The thin metal wall of the dip-cup 40 is crimped at a number of circumferentially spaced positions on to the hollow body 8, so as to leave three capillary channels 48 extending longitudinally between the internal surface of the dip-cup and the external surface of the metering chamber body. The crimping of the dip-cup on to the body 8 ensures that the dip-cup is retained in position, and in this embodiment three capillary channels equally spaced at 120° apart are provided.

In this embodiment, with the container inverted into its dispensing position, the filling of the metering chamber 33 within the body 8 by the liquid contents of the container takes place along a path which extends past the gasket 6, through the annular gap 44 between the dip-cup 40 and the casing flange 10, along the three capillary channels 48 to the enclosure 32, and along the groove 34 past the sealing washer 18 into the metering chamber 33. Discharge of the contents of the metering chamber through the orifice 35 and valve outlet passage 36 takes place in exactly the same way as described above with reference to FIGS. 1 and 2.

Figure 3:
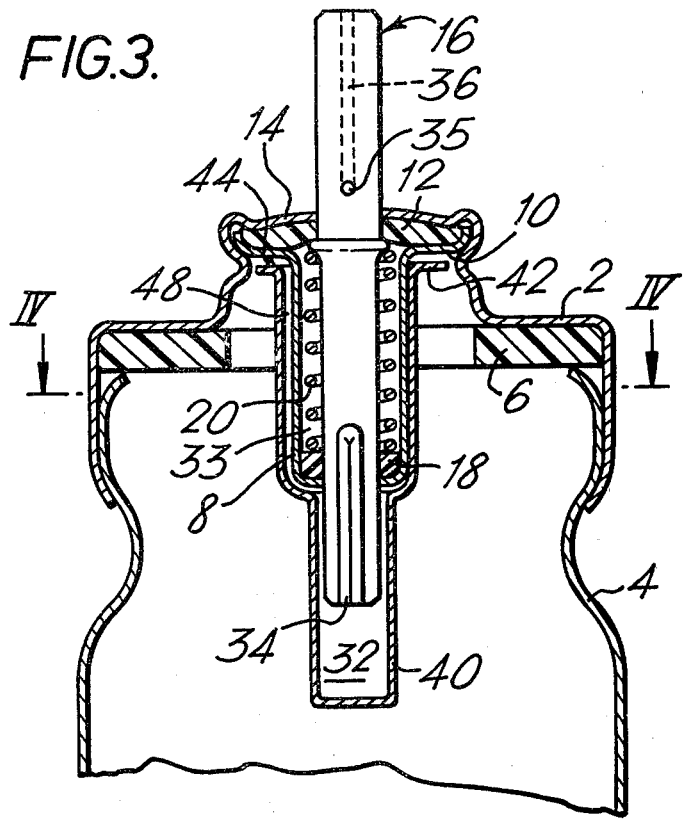
FIG. 3 is a sectional elevation of a second embodiment of valve assembly, fitted to a container, and again shown in the non-operative position.
Figure 4:
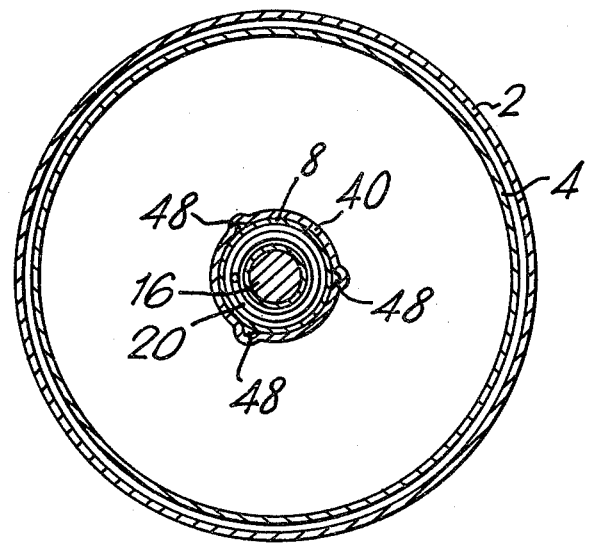
FIG. 4 is a section taken along the line IV—IV of FIG. 3.
Figure 5:
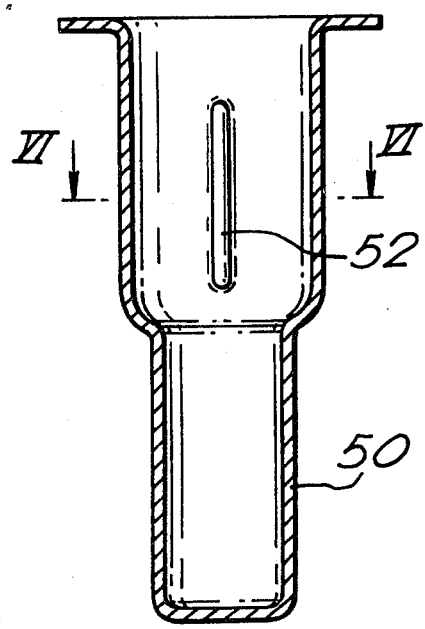
FIG. 5 is a longitudinal sectional view through a modified form of dip-cup; and, FIG. 6 is a section taken along the line VI—VI of FIG. 5.
Figure 6:
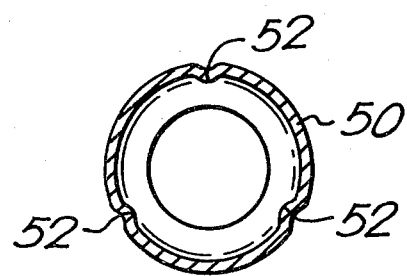

FIGS. 5 and 6 show a modified form of dip-cup which can be used instead of the dip-cup 40 shown in FIGS. 3 and 4. The construction of the dip-cup 50 shown in FIGS. 5 and 6 is substantially the inverse of the construction shown in FIGS. 3 and 4, in that, whereas in FIGS. 3 and 4 the crimping operation leaves three radially outwardly projecting longitudinally extending ribs which define the capillary channels 48, in FIGS. 5 and 6 the crimping operation produces three radially inwardly projecting ribs 52, equally spaced at 120° apart, with intermediate capillary channels which have considerable arcuate length as compared with those in the embodiment shown in FIGS. 3 and 4. As will be seen from FIG. 5, it is not necessary that the crimped ribs 52 extend the full length of the larger diameter, outward portion of the dip-cup 50.

In each of the illustrated embodiments, with the container 4 inverted in its dispensing position, all the container contents will find their way by capillary action through the plurality of capillary channels into the metering chamber. As the entrance to the capillary channels is at the very "bottom" of the container when it is inverted, virtually all the contents of the container can be used.

Although four capillary channels are shown in the valve assembly of FIGS. 1 and 2, and three such channels are shown in the valve assemblies of FIGS. 3 to 6, it is envisioned that any appropriate alternative number of capillary channels may be provided. In every case however, the object is to retain liquid in the capillary channels at all stages of operation of the valve assembly, thereby to prevent the gas bubbles being trapped and subsequently swept into the metering chamber during a subsequent filling of the metering chamber.

We claim:

1. A valve assembly comprising a casing member adapted to form a portion of an aerosol container; a first hollow body secured to the inside of the casing member; an elongate valve member sealingly extending through respective apertures in the casing member and the first hollow body for longitudinal inward movement during a dispensing operation, having an outlet passage and an inlet passage at its outer and inner ends respectively, and operative to connect a chamber formed by the spce inside the first hollow body around the valve member with the outside and inside respectively of the container; and a second hollow body encircling the first hollow body and in gripping contact with the external surface of the first hollow body at a plurality of circumferentially spaced regions thereby defining a plurality of liquid retaining capillary channels between the two bodies and between said regions.

2. A valve assembly in accordance with claim 1, in which the second hollow body is of plastic material and deforms to grip the external surface of the first hollow body at the plurality of circumferentially spaced regions which extend longitudinally of the hollow bodies.

3. A valve assembly in accordance with claim 2, in which the outward end of the second hollow body is provided with abutment means in engagement with a portion of the first hollow body to define a plurality of passageways therebetween for the passage of liquid from the container to the capillary channels.

4. A valve assembly in accordance with claim 1, in which the second hollow body is of metal and comprises a generally cylindrical cup having its wall deformed at the plurality of circumferentially spaced regions.

5. A valve assembly as claimed in claim 4, in which the wall of the second hollow body is crimped on to the first hollow body.

6. A valve assembly in accordance with claim 4, in which the wall of the second hollow body is radially inwardly deformed to provide a plurality of circumferentially spaced ribs with arcuate capillary channels between the ribs.

7. A valve assembly in accordance with claim 4, in which the wall of the second hollow body is deformed into gripping engagement with the external surface of the first hollow body over a substantial portion of the circumference of the first hollow body, with a plurality of intermediate radially outwardly extending ribs, with the capillary channels being defined between the internal surface of the ribs and the adjacent external surface of the first hollow body.

8. A valve assembly in accordance with claim 4, which includes an annular passageway between the outward end of the second hollow body and a radial flange on the first hollow bcdy adjacent to the casing member, the annular passageway enabling the liquid contents of the container to pass from the interior of the container to the capillary channels.

* * * * *